(12) United States Patent
Kim (10) Patent No.: US 12,220,971 B2
(45) Date of Patent: Feb. 11, 2025

(54) THERMAL MANAGEMENT SYSTEM FOR VEHICLE

(71) Applicants: Hyundai Motor Company, Seoul (KR); Kia Corporation, Seoul (KR)

(72) Inventor: Jong Won Kim, Cheonan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 192 days.

(21) Appl. No.: 18/068,015

(22) Filed: Dec. 19, 2022

(65) Prior Publication Data
US 2024/0034127 A1 Feb. 1, 2024

(30) Foreign Application Priority Data
Jul. 29, 2022 (KR) .................. 10-2022-0094307

(51) Int. Cl.
*B60H 1/32* (2006.01)
*B60H 1/00* (2006.01)

(52) U.S. Cl.
CPC ....... *B60H 1/3228* (2019.05); *B60H 1/00885* (2013.01); *B60H 1/3205* (2013.01)

(58) Field of Classification Search
CPC .............. F25B 43/006; F25B 2400/051; F25B 2400/0415; F25B 2400/16; F25B 2600/2523; B60H 1/3228; B60H 1/00885; B60H 1/00878; B60H 1/00899; B60H 1/00914; B60H 1/00921; B60H 1/3205
See application file for complete search history.

(56) References Cited

U.S. PATENT DOCUMENTS

| | | | | |
|---|---|---|---|---|
| 2014/0090407 | A1* | 4/2014 | Piesker | A23L 3/36 62/119 |
| 2016/0052365 | A1* | 2/2016 | Kohigashi | B60H 1/00921 62/278 |
| 2018/0222287 | A1* | 8/2018 | Mieda | B60H 1/00914 |

* cited by examiner

*Primary Examiner* — Miguel A Diaz
(74) *Attorney, Agent, or Firm* — MCDONNELL BOEHNEN HULBERT & BERGHOFF LLP (57) ABSTRACT

Proposed is a thermal management system for a vehicle, the thermal management system including an accumulator at which vapor-liquid separation of a refrigerant is performed, a compressor configured to compress a refrigerant, an inner condenser at which heat exchange is performed between a refrigerant and heating air, an outer condenser at which heat exchange is performed between a refrigerant and external air, a first expansion valve configured to expand a refrigerant, an evaporator at which heat exchange is performed between a refrigerant and heating air, a refrigerant recirculation line diverging from a refrigerant line between the compressor and the inner condenser, connected to the accumulator, and provided to selectively recirculate a refrigerant compressed by the compressor to the accumulator, and a discharge valve installed in the refrigerant recirculation line and provided to be able to selectively discharge a refrigerant, which has passed through the refrigerant recirculation line, into the accumulator.

14 Claims, 8 Drawing Sheets

THERMAL MANAGEMENT SYSTEM FOR VEHICLE

CROSS REFERENCE TO RELATED APPLICATIONS

The present application claims priority to Korean Patent Application No. 10-2022-0094307, filed Jul. 29, 2022, the entire contents of which is incorporated herein for all purposes by this reference.

TECHNICAL FIELD

The present disclosure relates to a thermal management system for a vehicle and, more particularly, a thermal management system for a vehicle that can perform both heating and cooling using only a refrigerant in a vehicle.

BACKGROUND

In general, a vehicle is equipped with a thermal management system for performing thermal management on the entirety of the vehicle. A thermal management system manages energy for interior air-conditioning, cooling of power electronic (PE) parts, and cooling or heating of a batter in a vehicle.

A thermal management system for a vehicle may be defined in a broad meaning as a system including an air conditioning system and a heat pump system for air conditioning and a cooling system that uses cooling water or a refrigerant for thermal management and cooling of the parts of a power system.

A thermal management system of the related art includes a compressor a water cooled condenser (WCC), a chiller, an external condenser (an air cooled condenser), an internal heat exchanger (IHX), an expansion valve, etc.

The internal heat exchanger (IHX) may be an inner condenser, an evaporator, an accumulator, etc., and a compressor, an external condenser, and expansion valve, and an evaporator are main components of a common air conditioning system.

A thermal management system of the related art can be operated in a cooling mode in which heated air is supplied to the interior of a vehicle, a heating mode (an air conditioning mode) in which cooled air is supplied to the interior of a vehicle, a dehumidifying mode in which dehumidified air is supplied to the interior of a vehicle, etc.

When the thermal management system is operated in the heating mode, a refrigerant and an electric heater (e.g., a PTC heater) may be used, and when the temperature of the refrigerant is sufficiently high, it is possible to heat an interior using the high-temperature refrigerant even without operating the electric heater.

In a cryogenic external air condition in which a heat pump system is difficult to be used or a condition in which waste heat from power electronic parts or a battery is difficult to be recovered, a mode in which heat for heating an interior using compressor work (COP=1) may be performed (e.g., Tesla Lossy Mode is performed).

When such a heating mode, for example, Tesla Lossy Mode is operated, a high-temperature refrigerant compressed by a compressor passes through an inner condenser and heating air flows around the inner condenser so that air heated in the inner condenser by the high-temperature refrigerant is supplied to the interior of a vehicle.

As described above, while a high-temperature refrigerant and heating air passes through the inner condenser, heat exchange occurs between the refrigerant and the air in the inner condenser and the heat of the refrigerant transfers to the air, so air heated through this heat exchange can be supplied to the interior of a vehicle (heat discharge to interior), whereby interior heating can be achieved without operating an electric heater.

Further, in the heating mode in which a compressor is driven, as described above, some of the high-temperature and high-pressure refrigerant compressed by the compressor is sent to the inner condenser and the other is sent to the water cooled condenser, so the refrigerants discharge heat in the inner condenser and the water cooled condenser, respectively. Accordingly, the heat of the refrigerant transfers to heating air in the inner condenser (interior air heat discharge) and the heat of the refrigerant transfers to cooling water in the water cooled condenser.

As described above, in the heating mode in which the compressor is driven, cooling water should be circulated through a cooling water line by operating an electronic heat pump, etc. of a cooling system to discharge heat in the water cooled condenser.

The heat of the refrigerant transfers to the cooling water in the water cooled condenser, and the heat transferring to the cooling water transfers back to the refrigerant in a chiller. A chiller is a heat exchanger in which heat exchange between a refrigerant and cooling water occurs.

That is, the refrigerant that has transmitted heat to the cooling water in the water cooled condenser flows to a chiller through an expansion valve and the cooling water receiving heat in the water cooled condenser also flows to the chiller, so heat transfers back to the refrigerant from the cooling water in the chiller in which heat exchange occurs between the refrigerant and the cooling water.

In a water-cooled cooling system, cooling water is used to cool power electronic (PE) parts, such as a motor, an inverter, a charger, and a converter, a battery, oil (using an oil cooler), etc., and cooling water that has cooled power electronic parts or a battery transmits heat to an air-conditioning refrigerant in a chiller.

Accordingly, in the water-cooled cooling system, it is possible to discharge heat of cooling water to the outside and it is possible to use a refrigerant receiving heat from the cooling water in the heating mode, so it is possible to recover and use waste heat.

However, in a thermal management system of the related art that uses compressor work in a heating mode, as described above, it is possible to a high-temperature and high-pressure refrigerant compressed by a compressor as a heat source that supplies heat for interior heating instead of an electric heater (e.g., a PTC heater), but it is impossible to supply compressor work over Coefficient of Performance (COP)=1 and it is required to use both a refrigerant and cooling water, so a loss of heat may be generated when heat transfers.

That is, a specific heat transfer medium such as cooling water is required to supply additional heat amount for heating during a heating mode, so there is a defect that a loss of heat may be generated when heat transfers, and a separate cooling water circulation process for implementing the mode is required.

Further, although compressor work (=load) is used to supply a heat amount of a thermal management system in heating, there is limitation that only the speed (RPM) of a compressor should be increased to secure sufficient heat from compressor work, and as a result, there is a problem that noise is generated and the life span of the compressor is reduced by high-speed operation. Further, when only compressor work is used for heating in a thermal management system, there is a defect that it takes long time to obtain a sufficient heat amount for heating.

SUMMARY

Accordingly, the present disclosure has been made in an effort to solve the problems described above and an objective of the present disclosure is to provide a thermal management system for a vehicle that can perform both heating and cooling using only a refrigerant in a vehicle, that can perform heating even without using or even minimally using an electric heater because it can supply a sufficient heat amount for heating even using only compressor work, and that can solve the problems of securing a sufficient heat amount, noise, and durability of a compressor that are generated when only compressor work is used.

The objectives of the present disclosure are not limited to those described above and other objectives not stated herein would be apparent to those who have ordinary skills in the art that the present disclosure belongs to (hereafter, "those skilled in the art") from the following description.

In order to achieve the objectives, according to an embodiment of the present disclosure, there is provided a thermal management system for a vehicle, the thermal management system including: an accumulator at which vapor-liquid separation of a refrigerant is performed; a compressor configured to compress a refrigerant; an inner condenser at which heat exchange is performed between a refrigerant and heating air; an outer condenser at which heat exchange is performed between a refrigerant and external air; a first expansion valve configured to expand a refrigerant; an evaporator at which heat exchange is performed between a refrigerant and heating air; a refrigerant recirculation line diverging from a refrigerant line between the compressor and the inner condenser, connected to the accumulator, and provided to selectively recirculate a refrigerant compressed by the compressor to the accumulator; and a discharge valve installed in the refrigerant recirculation line and provided to be able to selectively discharge a refrigerant, which has passed through the refrigerant recirculation line, into the accumulator.

Therefore, according to the thermal management system of the present disclosure, it is possible to achieve a refrigerant recirculation effect using the accumulator that functions as a vapor-liquid separator and it is possible to provide an operation mode that uses the refrigerant recirculation effect.

Further, it is possible to secure a sufficient heat amount for heating by additionally using a refrigerant recirculation effect with compressor work, and it is possible to solve all of the problems of securing a sufficient heat amount, noise, and durability of a compressor that are generated when only compressor work is used.

Further, in the present disclosure, it is possible to perform both heating and cooling using only a refrigerant and to implement a Tesla Lossy mode, in which heat for heating is supplied using compressor work, using only a refrigerant even without cooling water.

Further, in the present disclosure, it is possible to supply additional heat for heating using compressor work (=load) and the refrigerant recirculation effect in heating, whereby there is an advantage that it is possible to reduce the amount of use of an electric heater (a PTC heater).

Further, in the present disclosure, since the heat exchange unit for heat exchange between refrigerants is installed in the accumulator and is used one of internal heat exchangers (IHX), so a double-pipe effect can be achieved by the accumulator and the heat exchange unit. In particular, it is possible to secure an additional subcooling period (supercooling) by the heat exchange unit, so there is an effect of increasing cooling performance.

As a result, a Tesla Lossy mode in heating and a double-pipe effect in cooling can be achieved, energy efficiency of the system can be improved, and both the cooling performance and the heating performance of the thermal management system can be improved.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION

Embodiments of the present disclosure will be described hereafter in detail with reference to the accompanying drawings. Description of specific structures and functions disclosed in embodiments of the present disclosure are only an example for describing the embodiments according to the concept of the present disclosure and the embodiments according to the concept of the present disclosure may be implemented in various ways. The present disclosure is not limited to the embodiments described herein and should be construed as including all changes, equivalents, and replacements that are included in the spirit and the range of the present disclosure.

It will be understood that, although the terms first and/or second, etc. may be used herein to describe various elements, but these elements should not be limited by these terms. These terms are only used to distinguish one element from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent", or "directly adjacent" should be interpreted in the same manner as those described above.

Like reference numerals indicate the same components throughout the specification. The terms used herein are provided to describe embodiments without limiting the present disclosure. In the specification, a singular form includes a plural form unless specifically stated in the sentences. The terms "comprise" and/or "comprising" used herein do not exclude that another component, step, operation, and/or element exist or are added in the stated component, step, operation, and/or element.

Figure 1:
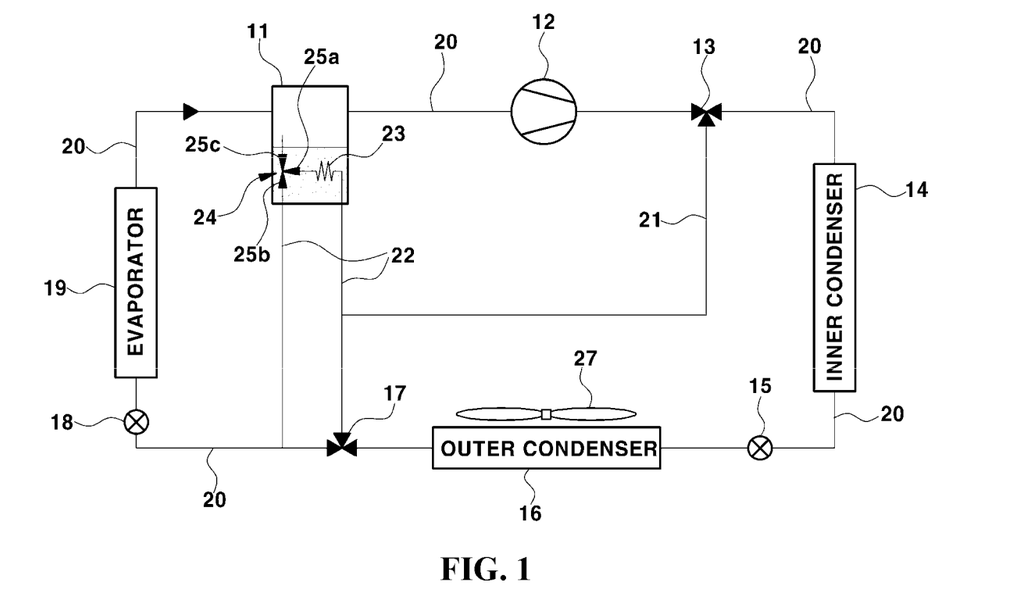
FIG. 1 is a diagram showing the configuration of a thermal management system according to an embodiment of the present disclosure.
Figure 2:
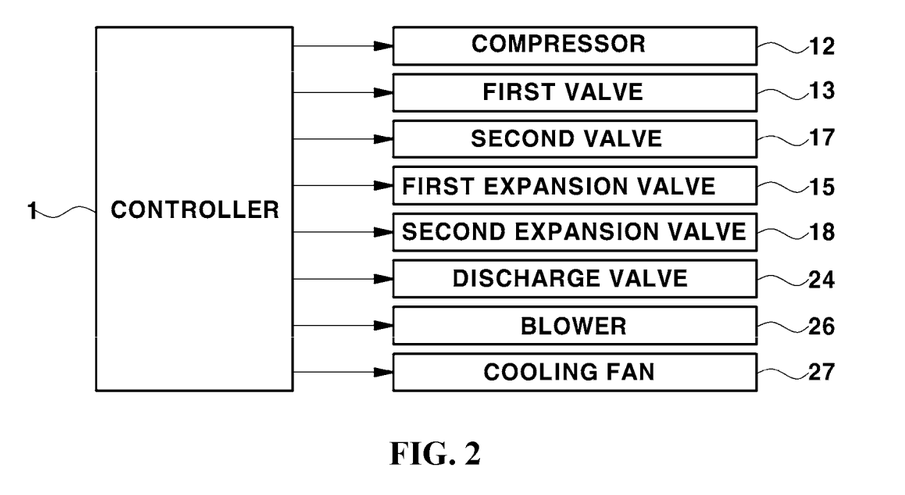
FIG. 2 is a block diagram showing a control element and operation element in the thermal management system according to an embodiment of the present disclosure.

FIG. 1 is a diagram showing the configuration of a thermal management system according to an embodiment of the present disclosure, which shows a thermal management circuit for cooling and heating of a vehicle. FIG. 2 is a block diagram showing a control element and operation elements in the thermal management system according to an embodiment of the present disclosure, which shows a controller 1, valves, and a compressor 12.

As shown in the figures, a thermal management system according to an embodiment of the present disclosure includes an accumulator 11, a compressor 12, a first valve 13, an inner condenser 14, a second expansion valve 15, an outer condenser (an air cooled condenser) 16, a second valve 17, a first expansion valve 18, and an evaporator 19 that are disposed along a path through which a refrigerant circulates.

The components of the thermal management system are connected through a refrigerant line 20 so that a refrigerant can circulate, and the first valve 13 and the second valve 17, and the first expansion valve 18 and the second expansion valve 15 may be electronic valves having internal channels of which the opening-closing state and the opening amount are controlled by the controller 1. The first valve 13 and the second valve 17 of the valves may be 3-way valves.

In the thermal management system, the refrigerant line 20 of the has a second diverging pipe 22 diverging from the refrigerant line at the outlet of the outer condenser 16, passing through the accumulator 11, and then connected back to the refrigerant line at the outlet of the outer condenser 16.

The second diverging pipe 22 diverges from an upstream position of the refrigerant line at the outlet of the outer condenser 16 in the refrigerant flow direction and is then connected to the inside of the accumulator 11, and the second valve 17 that is a 3-way valve is installed at the diverging point at the upstream position from which the second diverging pipe 22 diverges in the refrigerant line at the outlet of the outer condenser 16.

The second diverging pipe 22 that has passed through the accumulator 11 joins the refrigerant line at a downstream position in the refrigerant flow direction of the refrigerant line at the outlet of the outer condenser 16, that is, at a downstream position further than the position, at which the second valve 17 is installed, of the refrigerant line at the outlet of the outer condenser 16.

The second diverging pipe 22 is installed to pass through the lower portion of the internal space of the accumulator 11, and a heat exchange unit 23 is installed in the second diverging pipe 22 in the accumulator 11. That is, the heat exchange unit 23 is installed in the second diverging pipe 22 that passes through the lower portion of the internal space of the accumulator 11, and the internal channel of the second diverging pipe 22 and the internal channel of the heat exchange unit 23 communicate with each other.

The heat exchange unit 23 is installed at the line section of the second diverging pipe 22 that is positioned in the accumulator 11, and a discharge valve 24 that is a 3-way valve is installed at the line section of the second diverging pipe 22 at the outlet of the heat exchange unit 23 to be positioned in the accumulator 11.

The discharge valve 24 may also be an electronic valve having an internal channel of which the opening-closing state and the opening amount are controlled by the controller 1. The line section of the second diverging pipe 22 at the outlet of the heat exchange unit 23 is connected to a first port 25a of the discharge valve 24 installed in the accumulator 11, so the refrigerant flowing through the second diverging pipe 22 sequentially passes through the heat exchange unit 23 and the discharge valve 24.

The line section of the second diverging pipe 22 that extends out of the accumulator 11 and is connected to the refrigerant line at the outlet of the outer condenser 16 is connected to a second port 25b of the discharge valve 24 in the accumulator 11.

That is, the line section of the second diverging pipe 22 that is connected to the refrigerant line 20 between the second valve 17 and the first expansion valve 18 from the inside of the accumulator 11 is connected to the second port 25b of the discharge valve 24.

The discharge valve 24 has a discharge port 25c for discharging a refrigerant into the accumulator 11. Accordingly, a refrigerant compressed by the compressor 12, as will be described below, is recirculated through the first valve 13, the first diverging pipe 21, and the second diverging pipe 22 and then discharged into the accumulator 11 through the discharge port 25c of the discharge valve 24.

In the refrigerant flow direction, the first expansion valve 18 is installed in the refrigerant line 20 at a downstream position further than the joining position of the second diverging pipe 22, the evaporator 19 is installed at a downstream position further than the first expansion valve 18, and the accumulator 11 is installed at a downstream position further than the evaporator 19.

That is, the refrigerant line at the outlet of the first expansion valve is connected to an inlet of the evaporator 19 and the refrigerant line at the outlet of the evaporator 19 is connected to the inlet of the accumulator 11. The refrigerant line at the outlet of the accumulator 11 is connected to the inlet of the compressor 12 and the refrigerant line at the outlet of the compressor 12 is connected to the inlet of the inner condenser 14. Accordingly, when the compressor 12 is driven, the refrigerant stored in the accumulator 11 can be suctioned and then compressed in the compressor and then discharged to the refrigerant line at the inlet of the inner condenser 14.

The second expansion valve 15 is installed in the refrigerant line at the outlet of the inner condenser 14, the refrigerant line at the outlet of the second expansion valve 15 is connected to the inlet of the outer condenser 16, and the refrigerant line 20 at the outlet of the outer condenser 16 is connected to the second valve 17.

The first diverging pipe 21 diverges from the refrigerant line at the outlet of the compressor 12 and is connected to the line section of the second diverging pipe 22 at the inlet of the accumulator 11, that is, the line section of the second diverging pipe 22 between the second valve 17 and the accumulator 11. The first valve 13 that is a 3-way valve is installed at the diverging position, at which the first diverging pipe 21 diverges, in the refrigerant line at the outlet of the compressor 12.

In the present disclosure, the first diverging pipe 21 and the second diverging pipe 22 are refrigerant recirculation lines connected to the accumulator 11 from the refrigerant line 20 between the compressor 12 and the inner condenser 14 to recirculate the high-temperature and high-pressure refrigerant compressed by the compressor 12 to the accumulator 11.

In the present disclosure, the first diverging pipe 21, the second diverging pipe 22, the first valve 13, the second valve 17, and the discharge valve 24 are refrigerant lines and valves constituting a refrigerant recirculation circuit for recirculating the high-temperature and high-pressure refrigerant compressed by the compressor 12 to the accumulator 11, and are used to recirculate the high-temperature and high-pressure refrigerant compressed by the compressor to the accumulator 11 through the first valve 13 from the refrigerant lines at the inlet of the inner condenser 14 and the outlet of the compressor 12 while the compressor 12 is driven.

In the configuration, the accumulator 11, the compressor 12, the outer condenser 16, the first expansion valve 18, and the evaporator 19 are components of well-known air conditioning systems that recirculate a refrigerant and use a refrigeration cycle. In these components, the compressor 12 may be an electric compressor that is operated by power from a battery.

The internal heat exchanger (IHX) in the configuration may be the inner condenser 14, the evaporator 19, the accumulator 11 that shows a double-pipe effect in heating while functioning as a vapor-liquid separator, or the like.

The accumulator 11 in the configuration is provided such that a refrigerant is separated into vapor and liquid therein, the refrigerant line at the outlet of the evaporator 19 is connected to the refrigerant inlet of the accumulator 11, and the refrigerant line at the inlet of the compressor 12 is connected to the refrigerant outlet of the accumulator 11.

In an embodiment of the present disclosure, the accumulator 11, as described above, has a heat exchanger type of device configuration having the heat exchange unit 23 through which a refrigerant passes. The accumulator 11 is installed in the refrigerant line 20 between the evaporator 19 and the compressor 12 such that only a gas-state refrigerant is supplied to the compressor 12, thereby improving efficiency and durability of the compressor.

The compressor 12 in the configuration is a component for compressing a refrigerant, and the inner condenser 14 and the outer condenser 16, which are provided such that heat exchange occurs between a refrigerant and air, condense the refrigerant compressed by the compressor 12 into liquid.

The inner condenser 14 of the two condensers is installed in a passage for supplying heating air into a vehicle, and the outer condenser 16 may be installed at the front of a car body through which air, which flows inside through an opening at the front of a vehicle, can pass.

An electric heater (e.g., a PTC heater) not shown may be further installed in the passage in which the inner condenser 14 is installed. The electric heater is operated by power from a battery and the operation of the electric heater is controlled by the controller 1.

When the electric heater operates, the electric heater heats heating air that is blown by a blower 26, and heating air heated while passing through the electric heater is supplied into a vehicle, whereby heating can be performed.

In an embodiment of the present disclosure, the second expansion valve 15 is installed in the refrigerant line at the inlet of the outer condenser 16 and the first expansion valve 18 is installed in the refrigerant line at the inlet of the evaporator 19. The first expansion valve 18 and the second expansion valve 15 both serve to expand a refrigerant liquefied through condensation, and each may have an expansion section and a bypass passage in a valve body thereof.

The first expansion valve 18 and the second expansion valve 15 are both may be electronic expansion valves having an internal channel of which the opening-closing state and the opening amount are controlled by the controller 1. When the first expansion valve 18 and the second expansion valve 15 are controlled to be fully opened by the controller 1, the bypass passage is fully opened and the internal channel of the expansion section is closed, whereby a refrigerant flows only through the bypass passage without flowing through the refrigerant channel of the expansion section. Since a refrigerant passes through the bypass passage of the first expansion valve 18 and the second expansion valve 15 and bypasses the expansion section, the refrigerant does not expand.

The evaporator 19 cools air that is blown into a vehicle using latent heat of evaporation of the refrigerant expanding through the first expansion valve 18 while evaporating the refrigerant. The evaporator 19 may be installed in an air passage that is connected to the interior of a vehicle to supply heating air into the vehicle, that is, may be installed in a heating air passage provided separately from the heating air passage in which the inner condenser 14 is installed.

In an embodiment of the present disclosure, in a heating mode, cooling air suctioned by the blower 26 passes through the evaporator 19, is cooled by a low-temperature refrigerant in the evaporator while passing through the evaporator 19, and is then discharged into a vehicle, whereby interior heating is performed.

As will be described below, when a refrigerant is recirculated in a heating mode, air in a vehicle (interior air) is suctioned and then blown to pass through the evaporator 19 by the blower 26 or a specific blower (not shown) for interior air heat absorption. Accordingly, the heat of the air in the vehicle can transfer to the refrigerant passing through the evaporator 19 and the heat of the air in the vehicle can be absorbed through the refrigerant in the evaporator 19.

The configuration of a thermal management system according to an embodiment of the present disclosure was described above, and operation modes of the thermal management system are described in detail hereafter.

In the thermal management system of the present disclosure, it is possible to achieve a refrigerant recirculation effect using the accumulator 11 that functions as a vapor-liquid separator and it is possible to provide an operation mode that uses the refrigerant recirculation effect.

The thermal management system of the present disclosure can perform both heating and cooling using only a refrigerant and can implement a Tesla Lossy mode, in which heat for heating is supplied using compressor work, using only a refrigerant even without cooling water.

In the thermal management system of the present disclosure, it is possible to supply an additional heat amount for heating using compressor work (=load) and the refrigerant recirculation effect in heating, whereby there is an advantage that it is possible to reduce the amount of use of an electric heater (a PTC heater).

In the present disclosure, the accumulator 11 and the heat exchange unit may be used as an internal heat exchanger IHX and the heat exchange unit 23 that performs heat exchange with a refrigerant is installed in the accumulator 110, so a double-pipe effect can be achieved by the accumulator 11 and the heat exchange unit 23.

In particular, it is possible to secure an additional subcooling (supercooling) period by the heat exchange unit 23 installed in the accumulator 11, and accordingly, there is an effect that cooling capacity increases.

As a result, a Tesla Lossy mode in heating and a double-pipe effect in cooling can be achieved, energy efficiency of the thermal management system can be improved, and both the cooling performance and the heating performance of the thermal management system can be improved.

Figure 3:
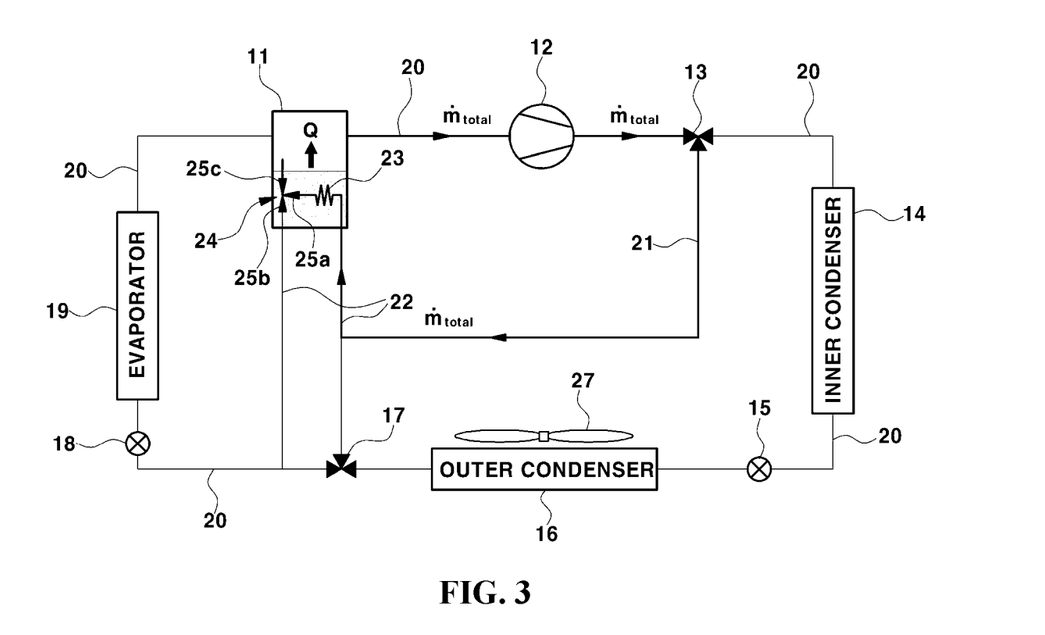
FIG. 3 is a diagram showing a refrigerant recirculation state that is performed in the early state of a heating mode in the thermal management system according to an embodiment of the present disclosure.
Figure 4:
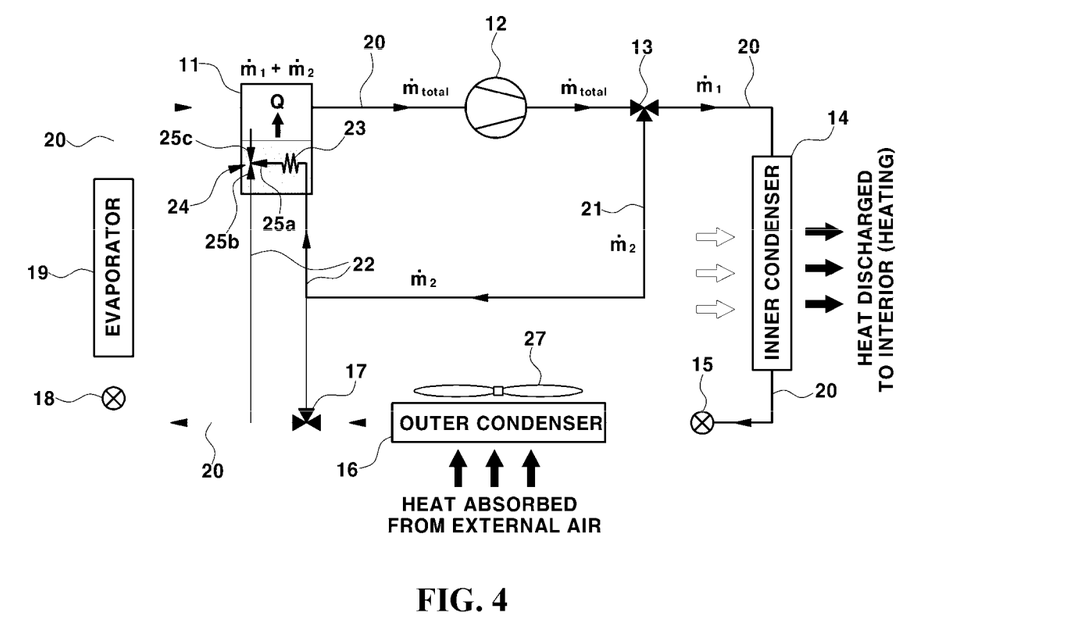
FIG. 4 is a diagram showing a refrigerant recirculation state for refrigerant recirculation and interior heat discharge in a heating mode in the thermal management system according to an embodiment of the present disclosure.
Figure 5:
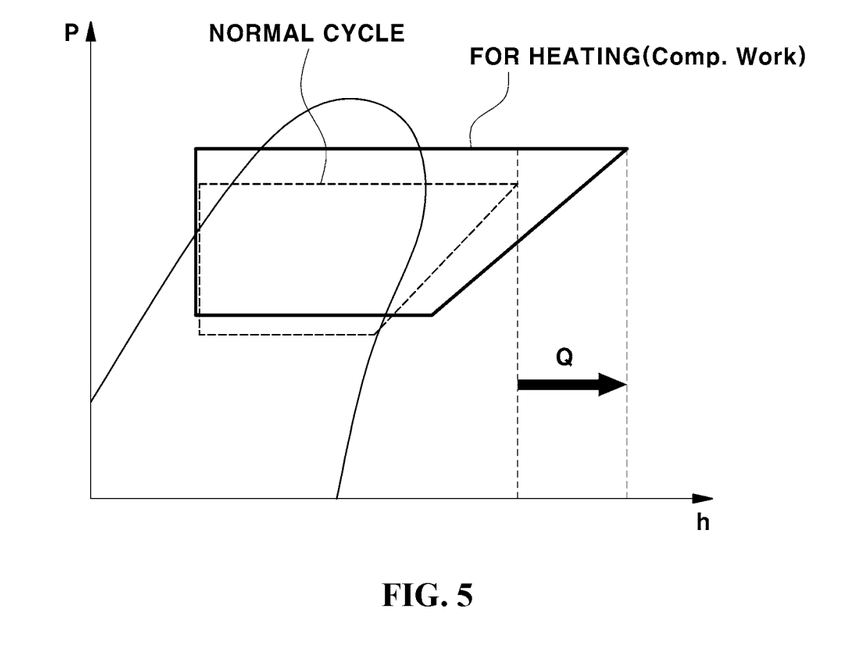
FIG. 5 is a diagram showing a P-H curve in the heating mode of FIG. 4.

FIGS. 3 and 4 are diagrams showing a heating mode of the thermal management system according to an embodiment of the present disclosure. FIG. 3 shows a refrigerant recirculation state that is performed in the early stage of the heating mode and FIG. 4 shows a refrigerant recirculation state for refrigerant recirculation and interior heat discharge in the heating mode. FIG. 5 is a diagram showing a P-H curve in the heating mode of FIG. 4.

A heating mode is described first with reference to the figures. The controller 1 drives and controls the compressor such that compressor work, that is, additional load is generated in the compressor 12, and a refrigerant compressed at a high temperature and a high pressure is discharged through the outlet of the compressor 12 that is in operation.

When the temperature of external air is very low, all the refrigerant compressed at a high temperature and a high pressure by the compressor 12 is recirculated to the accumulator 11 through a refrigerant recirculation circuit from the compressor 12 without using an electric heater (a PTC heater), as shown in FIG. 3. That is, all the high-temperature and high-pressure refrigerant compressed by the compressor 12 is recirculated to the accumulator 11 through the first diverging pipe 21 and the second diverging pipe 22.

The controller 1 controls the opening state of the discharge valve 24 such that the refrigerant recirculated to the accumulator 11 from the compressor 12 can be discharged into the accumulator 11 through the discharge port 25c of the discharge valve 24. In this case, the position of a valve body in a valve housing is controlled by the controller 1 to close only the internal channel connected to the second port 25b in the discharge valve 24.

The controller 1 controls also the opening states of the first valve 13 and the second valve 17. That is, in the first valve 13, a valve body in a valve housing is controlled to close the internal channel that is connected to the outlet port connected with the refrigerant line at the inlet of the inner condenser 14 and to open the internal channels that are respectively connected to the inlet port connected with the refrigerant line at the outlet of the compressor 12 and to the diverging port connected with the first diverging pipe 21

In the second valve 17, a valve body in a valve housing is controlled to close all of the internal channels that are respectively connected to the outlet port connected with the refrigerant line at the inlet of the first expansion valve 18 and to the diverging port connected with the second diverging pipe 22.

As described above, all the refrigerant compressed by the compressor 12 is recirculated to the accumulator 11 during the early stage of the heating mode, thereby increasing the entire heat amount of the thermal management system through compressor work.

As described above, the first diverging pipe 21 and the second diverging pipe 22 are refrigerant lines constituting a refrigerant recirculation circuit for recirculating the high-temperature and high-pressure refrigerant discharged from the compressor 12 to the accumulator 11.

The refrigerant recirculation circuit is used to recirculate the high-temperature and high-pressure refrigerant compressed by the compressor 12 to the accumulator 11 from the refrigerant line at the outlet of the compressor 12 through the first valve 13 and the discharge valve 24 while the compressor is driven in the early stage of the heating mode.

Next, the temperature and pressure of the refrigerant discharged from the compressor are increased to predetermined levels by compressor work (load) and a refrigerant recirculation effect during the early stage of the heating mode, the process is changed into the heating mode shown in FIG. 4 to perform both refrigerant recirculation and interior heating of a vehicle.

To this end, the controller 1 controls the opening state and the opening amount of the first valve 13 such that a portion of the refrigerant discharged from the compressor 12 flows to the inner condenser 14 from the first valve 13 through the refrigerant line 20 and the other refrigerant is recirculated to the accumulator 11 through the refrigerant recirculation circuit in the same way as the early stage of the heating mode shown in FIG. 3.

The other refrigerant distributed to the first diverging pipe 21 of the refrigerant recirculation circuit through the first valve 13 flows to the accumulator 11 through the first diverging pipe 21, the second diverging pipe 22, and the discharge valve 24 in the same way as the early stage of the heating mode described above.

A portion of the refrigerant compressed by the compressor 12 may be recirculated through a heating circuit including the inner condenser 14 to be used for heating, and the high-temperature and high-pressure refrigerant compressed by the compressor 12 heats the air flowing around the inner condenser while passing through the inner condenser 14.

That is, the heating air blown by the blower 26 and the high-temperature and high-pressure refrigerant passing through the inner condenser 14 exchange heat with each other in the inner condenser 14, and the heating air heated by the refrigerant at the inner condenser 14 is discharged into a vehicle, whereby heating is performed ("interior heat discharge").

The refrigerant that has passed through the inner condenser 14, as described above, passes through the second expansion valve 15. In this process, the second expansion valve is controlled by the controller 1 such that the refrigerant channel of the expansion section is opened, and accordingly, the refrigerant that has passed through the inner condenser 14 expands through the expansion section of the second expansion valve 15 and the expanding refrigerant flows at a low temperature and a low pressure to the outer condenser 16.

External air, that is, air flowing inside through the opening at the front of a vehicle is supposed to pass through the outer condenser 16, and external air suctioned by a cooling fan 27 can pass through the outer condenser 16.

While a refrigerant at a low temperature and a low pressure passes through the outer condenser 16, the refrigerant in the outer condenser 16 absorbs heat of air (external air) flowing around the outer condenser ("external air heat absorption"), and then, the refrigerant that has absorbed heat from the air moves to the accumulator 11 through the first expansion valve 18 and the evaporator 19 and is then mixed with the refrigerant in the accumulator 11.

In this process, the first expansion valve 18 is controlled to be fully opened by the controller 1, so the bypass passage is opened. Accordingly, the refrigerant flows through the bypass passage without passing through the expansion section of the first expansion valve 18, so the refrigerant intactly flows to the evaporator 19 without expanding. As a result, the refrigerant that has passed through the evaporator 19 flows to the compressor 12 after mixed with the refrigerant in the accumulator 11, and then undergoes again the refrigerant recirculation process described above.

As described above, a portion of the high-temperature and high-pressure refrigerant discharged from the compressor 12 flows to the heating circuit such that a heating mode is performed, and the other small amount of refrigerant is recirculated to the accumulator 11. Accordingly, it is possible to increase the heat amount of the thermal management system through refrigerant recirculation instead of using an electric heater.

During both the early stage of a heating mode shown in FIG. 3 in which only refrigerant recirculation is performed, and the heating mode shown in FIG. 4 in which heating by refrigerant recirculation and the inner condenser and the external air heat absorption process by the outer condenser are simultaneously performed, it is possible to secure an additional refrigerant flow rate through compressor work.

As a result, it is possible to reach a heat amount level for heating of the system using compressor work ("Comp. Work") and refrigerant recirculation even without using an electric heater in the earl stage of a heating mode, it is possible to improve heating effect and performance instead of an electric heater by increasing the flow rate of a refrigerant using compressor work during a heating mode, and it is possible to reduce the amount of use of an electric heater even though using the electric heater.

Further, when the temperature and pressure of a refrigerant have reached predetermined level during the heating mode, refrigerant recirculation can be stopped, and a normal heating mode in which all the high-temperature and high-pressure refrigerant compressed by the compressor 12 is recirculated through a heating circuit with refrigerant recirculation stopped can be performed.

During the normal heating mode, in the first valve 13, the internal channel connected to the diverging port connected with the first diverging pipe 21 is closed, and the internal channels connected to the inlet port, which is connected with the refrigerant line at the outlet of the compressor 12, and the outlet port connected with the refrigerant line at the inlet of the inner condenser 14 are opened.

Accordingly, all the refrigerant discharged from the compressor 12 flows only to the inner condenser 14 through the refrigerant line 20 from the first valve 13, and a high-temperature and high-pressure refrigerant heats heating air while passing through the inner condenser 14. Accordingly, the heating air heated through the inner condenser 14 is discharged into a vehicle, whereby heating is performed even without an electric heater (a PTC heater).

Figure 6:
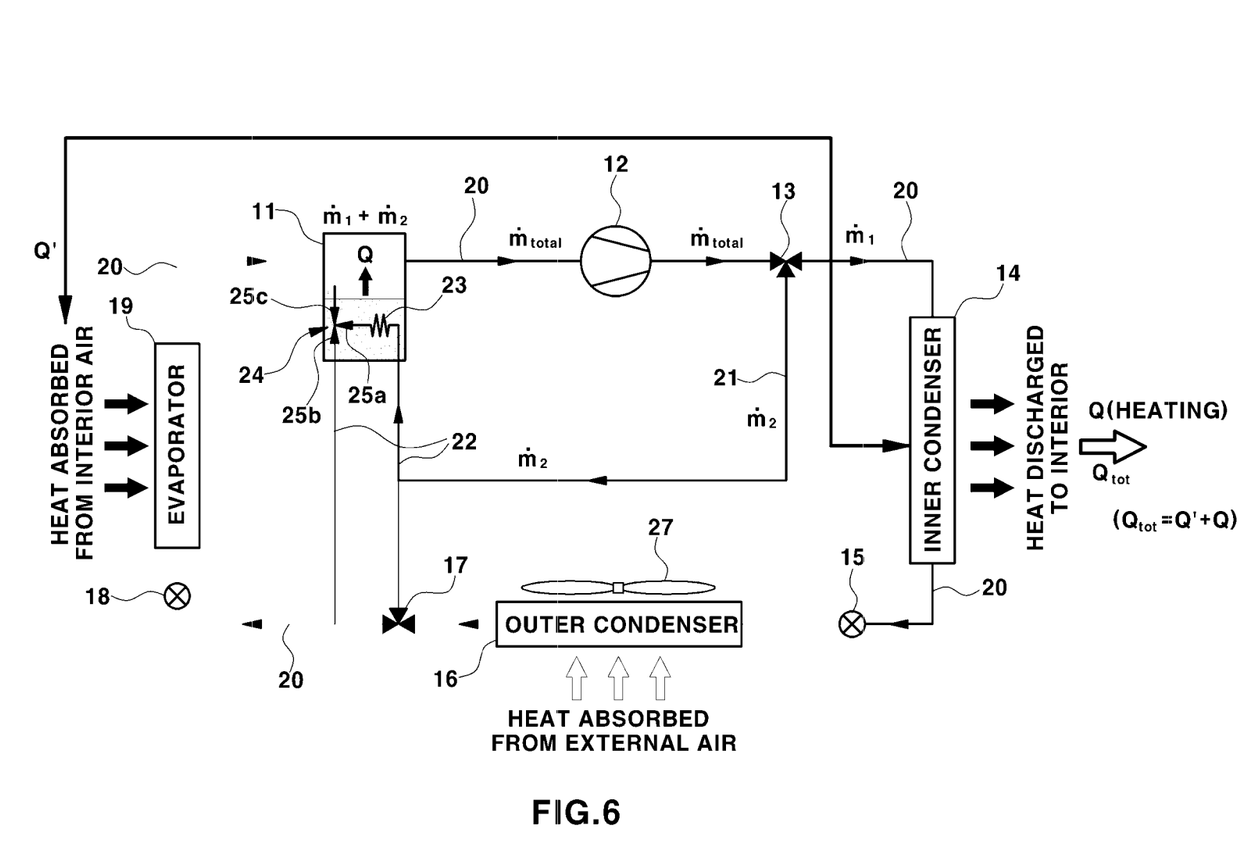
FIG. 6 is a diagram showing a refrigerant state in a heating mode in which an interior air heat absorption (interior heat absorption) process in the thermal management system according to an embodiment of the present disclosure.
Figure 7:
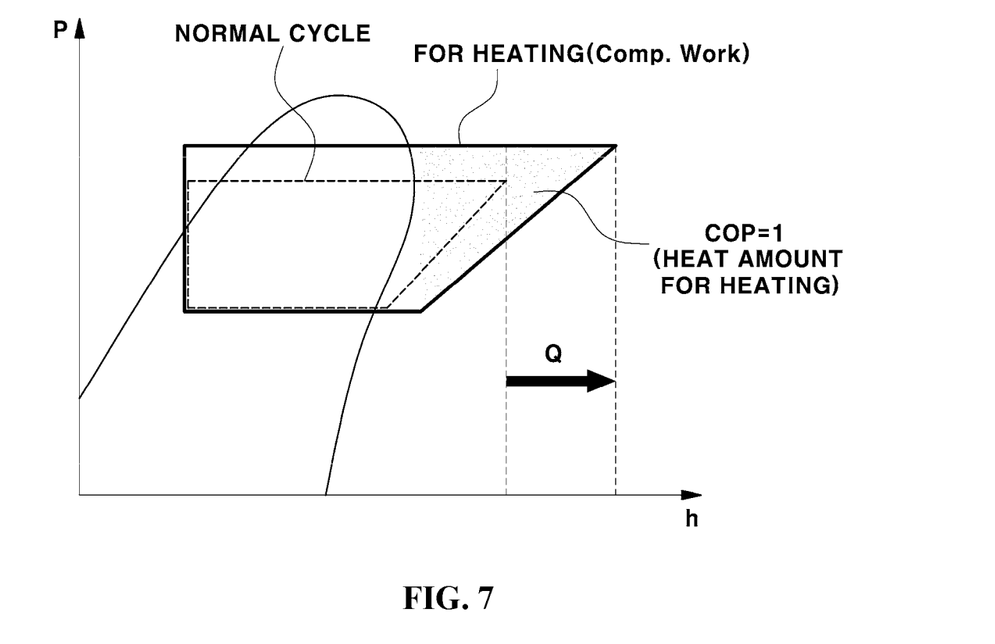
FIG. 7 is a diagram showing a P-H curve in the heating mode of FIG. 6.

Meanwhile, FIG. 6 is a diagram showing a refrigerant state in a heating mode in which the interior air heat absorption ("interior heat absorption") process is further performed in addition to refrigerant recirculation, interior heat discharge, and external air heat absorption, and FIG. 7 is a diagram showing a P-H curve in a heating mode.

The heating mode shown in FIG. 4 is a mode in which an external air heat absorption process is performed in addition to refrigerant recirculation and interior heat discharge for heating the interior of a vehicle, and in the heating mode shown in FIG. 4, heat can be supplied to the accumulator 11 that is a vapor-liquid separator by the refrigerant recirculation and the external air heat absorption process.

The heating mode shown in FIG. 6 is a mode in which an interior air heat absorption ("interior heat absorption") process is further performed in addition to refrigerant recirculation and interior heat discharge for heating the interior of a vehicle, and the an external air heat absorption process, and in the heating mode shown in FIG. 6, heat can be supplied to the accumulator 11 that is a vapor-liquid separator by the refrigerant recirculation, the external air heat absorption process, and the added interior heat absorption process.

The process of refrigerant recirculation in the heating mode shown in FIG. 6 is not different from that described with reference to FIGS. 3 and 4. The process in which heating is performed through interior heat discharge from the inner condenser 14 and the exterior air heat absorption process by the outer condenser 16 in the heating mode shown in FIG. 6 are also not different from that described with reference to FIGS. 3 and 4.

However, while the interior of a vehicle is heated through interior heat discharge in which heat transfers from a high-temperature and high-pressure refrigerant, which passes through the inner condenser 14, to heating air, the air in the vehicle (interior air) that is suctioned and blown by the blower 26 can flow around the evaporator 19.

In the heating mode shown in FIG. 6 in which interior air heat absorption is further performed, a refrigerant expands through the second expansion valve 15 after passing through the inner condenser 14, and the refrigerant that has expanded through the second expansion valve 15 passes through the outer condenser 16.

In this process, the second expansion valve 15 is controlled by the controller 1 such that the refrigerant channel of the expansion section thereof is opened, so the refrigerant that has passed through the inner condenser 14 can expand through the refrigerant channel of the expansion section in the second expansion valve 15.

Further, as described above, an external air heat absorption process of a refrigerant is performed in the outer condenser 16, and while a refrigerant passes through the outer condenser 16, the refrigerant receives heat from the external air flowing around the outer condenser 16 and then flows back to the first expansion valve 18 through the refrigerant line 20.

As described above, since the refrigerant has sufficiently reached a low temperature and a low pressure through the second expansion valve 15, the refrigerant passes through the bypass passage of the first expansion valve 18 without expanding after undergoing the external heat absorption process in the outer condenser 16.

That is, the first expansion valve 18 is controlled to be fully opened by the controller 1, and in this case, the bypass passage of the first expansion valve 18 is opened. Accordingly, a refrigerant does not pass through the expansion section of the first expansion valve 18 and intactly flow to the evaporator 19 without expanding through the bypass passage.

When air (interior air) introduced from the interior of a vehicle flows around the evaporator 19 while a refrigerant passes through the evaporator 19, heat exchange occurs between the refrigerant and the interior air at the evaporator 19, and in this process, the heat of the air transfers to the refrigerant, whereby interior air heat absorption ("interior heat absorption") is made by the refrigerant.

The refrigerant that has passed through the evaporator 19, as described above, thereafter, is recovered into the accumulator 11 through the refrigerant line 20, and the recovered refrigerant is mixed with the refrigerant in the accumulator 11. Thereafter, the refrigerant in the accumulator 11 flows to the compressor 12 and then undergoes again the refrigerant recirculation process described above.

As described above, in the heating mode shown in FIG. 6, refrigerant recirculation, interior heat discharge (interior air heat discharge), external air heat absorption, and interior air heat absorption ("interior heat absorption") can be simultaneously performed, and the refrigerant recirculation of these processes may be stopped, if necessary.

In the heating mode shown in FIG. 6, similar to the heating mode shown in FIGS. 3 and 4, a portion of a heat amount that is provided by compressor work can be supplied into the accumulator 11, which is a vapor-liquid separator, by refrigerant recirculation, and accordingly, a refrigerant that has absorbed heat supplied into the accumulator 11 can be supplied from the accumulator 11 to the compressor 12. The refrigerant receiving heat at the accumulator 11 in the refrigerant recirculation process during the heating mode recirculates through a refrigerant circuit such as a heating circuit.

As a result, in the heating mode shown in FIG. 6, refrigerant recirculation, and external air heat absorption and internal air heat absorption processes can be simultaneously performed by controlling compressor work (load) and valves, and heat can be continuously supplied to the accumulator 11 that is a vapor-liquid separator by the refrigerant recirculation, and external air heat absorption and internal air heat absorption processes.

Further, since a refrigerant is sent under pressure by driving the compressor 12, that is, a refrigerant is compressed at a high temperature and a high pressure and then sent out, it is possible to increase a refrigerant recirculation amount, and accordingly, it is possible to improve heat pump performance.

Further, it is possible to absorb heat from interior air using a refrigerant in the evaporator 19 and supply the heat of the interior air absorbed through the refrigerant to the accumulator 11, and simultaneously, it is possible achieve a Tesla Lossy mode effect in which COP is 1 through a heating process in which the refrigerant that has absorbed heat from the interior air circulates through a refrigerant circuit such as a heating circuit (see FIG. 7).

Figure 8:
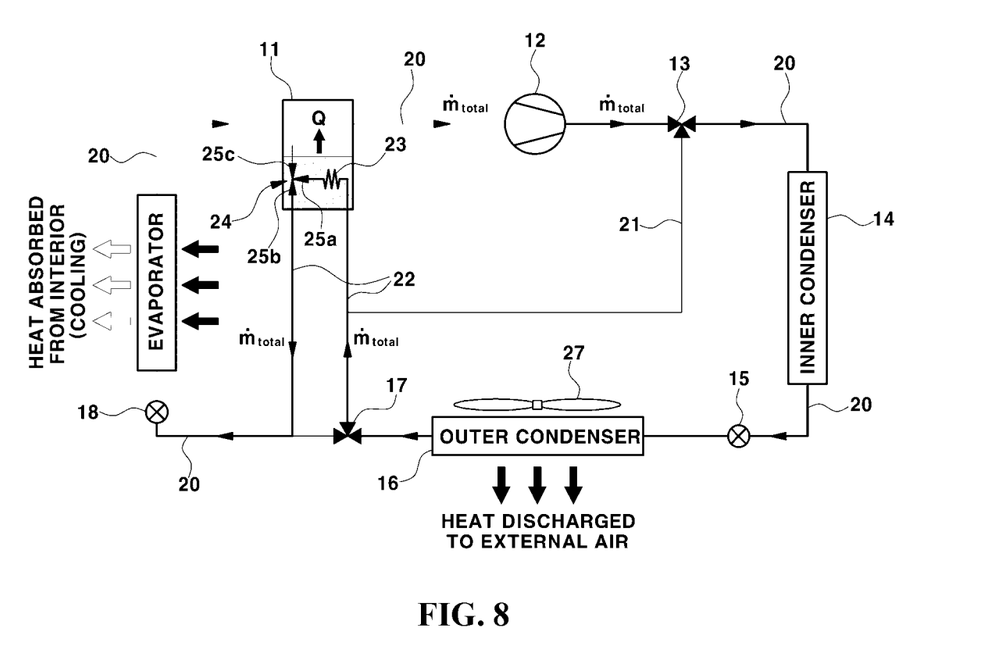
FIG. 8 is a diagram showing a refrigerant state in a cooling mode in the configuration of a thermal management system according to an embodiment of the present disclosure.
Figure 9:
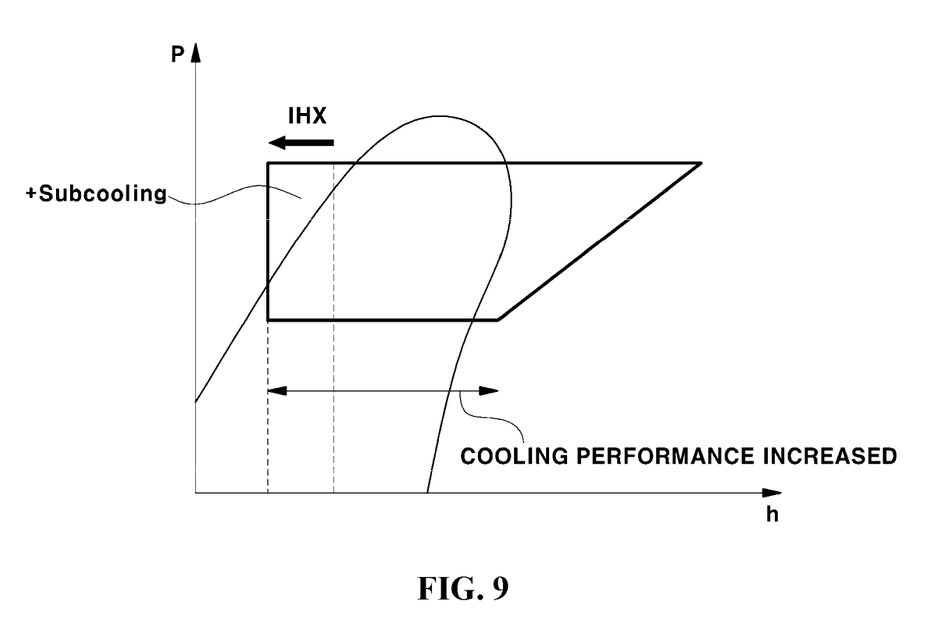
FIG. 9 is a diagram showing a P-H curve in the cooling mode of FIG. 8.

Next, FIG. 8 is a diagram showing refrigerant circulation and state in a cooling mode in the configuration of a thermal management system according to an embodiment of the present disclosure and FIG. 9 is a diagram showing a P-H curve in the cooling mode of FIG. 8.

In the cooling mode of the thermal management system according to an embodiment of the present disclosure, a refrigerant circulates in order of the accumulator 11, the compressor 12, the outer condenser 16, the first expansion valve 18, and the evaporator 19.

The operation and functions of the compressor 12, the outer condenser 16, the first expansion valve 18, and the evaporator 19 that are operated during the cooling mode are not different from those of the main components that perform the process of a refrigeration cycle in well-known air conditioning systems, that is, the operation and functions of a compressor, a condenser, an expansion valve, and an evaporator that are well known in the art.

However, in the first valve 13, the internal channel connected to the diverging port connected with the first diverging pipe 21 is controlled to be closed, and the internal channels connected to the outlet port, which is connected with the refrigerant line at the outlet of the evaporator 19, and the inlet port connected with the refrigerant line at the inlet of the inner condenser 14 are controlled to be opened.

Accordingly, all the high-temperature and high-pressure refrigerant discharged from the compressor 12 flows only to the inner condenser 14 without flowing to the first diverging pipe 21 from the first valve 13.

In this process, the second expansion valve 15 is controlled to be fully opened such that the expansion section is closed and the bypass passage is opened, whereby the high-temperature and high-pressure refrigerant passes through the second expansion valve 15 without expanding and then flows to the outer condenser 16 and keeps flowing through the outer condenser 16.

As described above, while a refrigerant passes through the outer condenser 16, external air suctioned by the cooling fan 27 and flowing inside through the opening at the front of a vehicle flows around the outer condenser 16. Accordingly, heat exchange occurs between the refrigerant and the external air in the outer condenser 16, and external air heat discharge in which heat of the refrigerant transfers to the external air is performed in the heat exchange process.

As described above, the refrigerant cooled and condensed by air in the outer condenser 16 flows from the second valve 17 to the second diverging pipe 22, moves to the accumulator 11 through the second diverging pipe 22, and then passes through the heat exchange unit 23 in the accumulator 11.

In this process, the opening-closing state of the second valve 17 is controlled by the controller 1 such that the refrigerant that has passed through the outer condenser 16 can flow to the accumulator 11 through the second diverging pipe 22 from the second valve 17. That is, the opening-closing state of the second valve 17 is controlled such that the refrigerant channel connected to the outlet port connected with the refrigerant line at the inlet of the first expansion valve 18 is closed and the internal channels connected to the inlet port connected with the refrigerant line at the outlet of the outer condenser 16 and to the diverging port connected with the second diverging pipe 22 are opened.

As described above, the refrigerant that has passed through the heat exchange unit 23 in the accumulator 11 is discharged from the accumulator 11, flows through the second diverging pipe 22, and then moves to the refrigerant line at the inlet of the first expansion valve 18 from the second diverging pipe 22.

In the cooling mode, by the controller 1, the expansion section is controlled to be closed and the bypass passage is controlled to be fully opened in the second expansion valve but the bypass passage is controlled to be opened and the expansion section is controlled to be opened in the first expansion valve 18 so that a refrigerant can expand well. Accordingly, a refrigerant expands into a low-temperature and low-pressure state in the first expansion valve 18 and then flows to the evaporator 19.

In this process, since cooling air that is blown by the blower 26 flows around the evaporator 19, heat exchange occurs between the refrigerant and the cooling air at the evaporator 19. In heat exchange, the refrigerant passing through the evaporator 19 absorbs heat from the cooling air flowing around the evaporator 19 ("interior heat absorption"), whereby the cooling air can be cooled at the evaporator 19.

As described above, the air cooled by the refrigerant at the evaporator 19 is discharged in a vehicle, whereby the interior of the vehicle is cooled. The refrigerant that has passed through the evaporator 19 moves to the accumulator 11 and is then circulated again through the same refrigerant circuit by the compressor 12 during the cooling mode.

During the cooling mode described above, as described above, all the refrigerant that has passed through the outer condenser 16 moves to the second diverging pipe 22 from the second valve 17 and the passes through the heat exchange unit 23, and heat exchange occurs in the accumulator 11 between the refrigerant passing through the heat exchange unit 23 after finishing external air heat discharge in the outer condenser 16 and the refrigerant stored outside the heat exchange unit 23.

In this process, since the temperature of the refrigerant passing through the heat exchange unit 23 is high, heat transfers from the refrigerant passing through the heat exchange unit 23 to the refrigerant stored outside the heat exchange unit 23. Further, since the discharge valve 24 is controlled to close the discharge port 25*c*, the refrigerant that has passed through the heat exchange unit 23 moves again through the second diverging pipe 22 outside accumulator 11 and then flows to the refrigerant line, and then moves to the first expansion valve 18.

The opening state of the internal channels of the discharge valve 25 is controlled by the controller 1 such that the first port 25*a* and the second port 25*b* communicate with each other and the discharge port 25*c* is closed. Accordingly, all the refrigerant that has passed through the heat exchange unit 23 flows to the second diverging pipe 22 outside the accumulator 11 without flowing into the accumulator 11.

While a refrigerant passes through the heat exchange unit 23 installed in the second diverging pipe 22, as described above, the refrigerant in the heat exchange unit 23 and the refrigerant outside the heat exchange unit 23 exchange heat with each other in the accumulator 11 that is a vapor-liquid separator, so it is possible to additionally secure a subcooling (supercooling) period of a refrigerant to be used for cooling by such heat exchange between refrigerants in the heat exchange unit 23.

Since a subcooling period is additionally secured, the entire cooling capacity of the thermal management system increases, so cooling performance can be improved. Further, the accumulator 11, which is a vapor-liquid separator, and the heat exchange unit 23 can be used as internal heat exchangers (IHX), so a double-pipe effect can also be secured.

Although embodiments of the present disclosure were described above in detail, the spirit of the present disclosure is not limited thereto and the present disclosure may be changed and modified in various ways on the basis of the basic concept without departing from the scope of the present disclosure described in the following claims.

What is claimed is:

1. A thermal management system for a vehicle, the thermal management system comprising:
    an accumulator at which vapor-liquid separation of a refrigerant is performed;
    a compressor configured to compress the refrigerant;
    an inner condenser at which heat exchange is performed between the refrigerant and a heating air;
    an outer condenser at which heat exchange is performed between the refrigerant and external air;
    a first expansion valve configured to expand the refrigerant;
    an evaporator at which heat exchange is performed between the refrigerant and the heating air;
    a refrigerant recirculation line diverging from a refrigerant line between the compressor and the inner condenser, connected to the accumulator, and provided to selectively recirculate the refrigerant compressed by the compressor to the accumulator, wherein the refrigerant recirculation line includes:
        a first diverging pipe provided to selectively pass the refrigerant compressed by the compressor; and
        a second diverging pipe diverging from a refrigerant line between the outer condenser and the first expansion valve, connected to the accumulator, and connected with the first diverging pipe such that the refrigerant that has passed through the first diverging pipe can flow to the accumulator;
    a discharge valve installed in the refrigerant recirculation line and provided to be able to selectively discharge the refrigerant, which has passed through the refrigerant recirculation line, into the accumulator;
    a first valve that is an electronic 3-way valve installed at a diverging point, at which the first diverging pipe diverges, in the refrigerant line between the compressor and the inner condenser;
    a second valve that is an electronic 3-way valve installed at a diverging point, at which the second diverging pipe diverges, in the refrigerant line between the outer condenser and the first expansion valve; and
    a controller configured to control an opening state of the first valve and the second valve such that a flow state of the refrigerant passing through the first valve and the second valve can be controlled.

2. The thermal management system of claim 1, wherein the controller, during an early stage of a heating mode, controls the opening state of the first valve such that all the refrigerant compressed by the compressor can flow to the first diverging pipe and the second diverging pipe, and controls an opening state of the discharge valve such that the refrigerant that has passed through the first diverging pipe and the second diverging pipe can be discharged into the accumulator.

3. The thermal management system of claim 2, wherein the controller controls the opening state of the first valve such that the refrigerant compressed by the compressor can be distributed to the refrigerant line, which is connected to the inner condenser, and to the first diverging pipe when a temperature and a pressure of the refrigerant discharged from the compressor increase to predetermined levels.

4. The thermal management system of claim 1, wherein the second diverging pipe passes through the accumulator, and
    the second diverging pipe that has passed through the accumulator is connected to a refrigerant line between the second valve and the first expansion valve.

5. The thermal management system of claim 4, wherein the discharge valve is an electronic valve that is installed in the accumulator, has a first port connected with the second diverging pipe extending from the second valve, a second port connected with the second diverging pipe extending to the refrigerant line between the second valve and the first expansion valve, and a discharge port configured to discharge the refrigerant into the accumulator, and has an internal channel of which an opening state is controlled by the controller such that the refrigerant flowing in the first port can flow to one selected from the second port and the discharge port.

6. The thermal management system of claim 5, wherein a heat exchange unit is installed at a line section of the second diverging pipe that passes through the accumulator, and the heat exchange unit is provided such that the refrigerant passing through the heat exchange unit after moving through the first diverging pipe and the second diverging pipe and the refrigerant stored outside the heat exchange unit in the accumulator exchange heat with each other.

7. The thermal management system of claim 6, wherein the discharge valve is installed, in the second diverging pipe, at a line section at an outlet of the heat exchange unit of the line section passing through the accumulator.

8. The thermal management system of claim 4, wherein a heat exchange unit is installed at a line section of the second diverging pipe that passes through the accumulator, and the heat exchange unit is provided such that the refrigerant passing through the heat exchange unit after moving through the first diverging pipe and the second diverging pipe and the refrigerant stored outside the heat exchange unit in the accumulator exchange heat with each other.

9. The thermal management system of claim 1, further comprising a second expansion valve installed in a refrigerant line between the inner condenser and the outer condenser and configured to expand the refrigerant that has passed through the inner condenser.

10. The thermal management system of claim 9, wherein the second expansion valve is an electronic expansion valve that is controlled by a controller to selectively expand the refrigerant flowing from the inner condenser to the outer condenser.

11. The thermal management system of claim 10, wherein the controller, during a heating mode, controls the second expansion valve to expand the refrigerant flowing from the inner condenser to the outer condenser and operates a cooling fan to blow external air around the outer condenser so that heat exchange occurs between the external air and the refrigerant at the outer condenser.

12. The thermal management system of claim 11, wherein the controller, during the heating mode, subsequently controls the first expansion valve not to expand the refrigerant such that the refrigerant that has passed through the outer condenser flows to the evaporator without expanding by the first expansion valve, and operates a blower to blow interior air of the vehicle around the evaporator so that heat exchange occurs between the interior air and the refrigerant at the evaporator.

13. The thermal management system of claim 10, wherein the controller, during a cooling mode, controls the second expansion valve not to expand the refrigerant such that the refrigerant that has passed through the inner condenser flows to the outer condenser without expanding by the second expansion valve.

14. The thermal management system of claim 1, wherein the first expansion valve is an electronic expansion valve that is controlled by a controller to selectively expand the refrigerant flowing from the outer condenser to the evaporator.

* * * * *